(12) United States Patent
Mosbach et al.

(10) Patent No.: US 8,689,949 B2
(45) Date of Patent: Apr. 8, 2014

(54) CONNECTION OF A BRAKE LINING AND A LINING MOUNT

(75) Inventors: Christian Mosbach, Alling (DE);
Michael Mathieu, Puchheim (DE);
Michael Lehneis, München (DE);
Christian Ebner, Augsburg (DE);
André Stegmann, Eichenau (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 209 days.

(21) Appl. No.: 13/145,639

(22) PCT Filed: Jan. 14, 2010

(86) PCT No.: PCT/EP2010/000173
§ 371 (c)(1),
(2), (4) Date: Aug. 4, 2011

(87) PCT Pub. No.: WO2010/086088
PCT Pub. Date: Aug. 5, 2010

(65) Prior Publication Data
US 2012/0152666 A1   Jun. 21, 2012

(30) Foreign Application Priority Data

Jan. 27, 2009   (DE) .......................... 10 2009 006 290

(51) Int. Cl.
*F16D 65/04*   (2006.01)
(52) U.S. Cl.
USPC ....... 188/244; 188/250 G; 188/245; 188/234; 188/242

(58) Field of Classification Search
None
See application file for complete search history.

(56) References Cited

U.S. PATENT DOCUMENTS

| 51,093 | A | * | 11/1865 | Sollers et al. | 188/244 |
|---|---|---|---|---|---|
| 1,044,243 | A | * | 11/1912 | Price | 188/243 |
| 1,892,816 | A | * | 1/1933 | Thornburgh | 188/245 |
| 2,027,823 | A | * | 1/1936 | Hoffman | 188/234 |
| 2,694,473 | A | * | 11/1954 | McMullen et al. | 188/236 |
| 3,851,738 | A | * | 12/1974 | Gebhardt et al. | 188/244 |
| 3,957,139 | A | * | 5/1976 | Hochhuth et al. | 188/244 |

(Continued)

FOREIGN PATENT DOCUMENTS

| DE | 1256113 B | 12/1967 |
|---|---|---|
| DE | 2547529 A1 | 4/1977 |
| EP | 0226816 A1 | 7/1987 |
| FR | 2687441 A1 | 8/1993 |

OTHER PUBLICATIONS

Search Report for International Patent Application No. PCT/EP2010/000173; Jun. 30, 2010.

*Primary Examiner* — Thomas Irvin
(74) *Attorney, Agent, or Firm* — Barnes & Thornburg LLP

(57) ABSTRACT

A connection of a brake lining, preferably a disc brake of a railway vehicle, having a lining mount, wherein the brake lining includes a guide bar on the back side thereof lying in a guide track of the lining mount and held on the lining mount by means of a clamping element of at least one clamping device engaging behind the guide bar under spring load and pressing against the guide track, designed so that the clamping element can be brought out of engagement by an actuating element rotatably or displaceably mounted on the lining mount.

21 Claims, 8 Drawing Sheets

(56) References Cited

U.S. PATENT DOCUMENTS

| | | | | |
|---|---|---|---|---|
| 4,090,591 | A | * | 5/1978 | Pollinger et al. ............. 188/73.1 |
| 4,271,936 | A | * | 6/1981 | Xaver et al. ................... 188/244 |
| 5,062,505 | A | * | 11/1991 | Sjarne et al. .............. 188/153 R |
| 5,613,579 | A | * | 3/1997 | Moore .......................... 188/244 |
| 6,349,805 | B1 | * | 2/2002 | Wirth et al. ................... 188/234 |

* cited by examiner

CONNECTION OF A BRAKE LINING AND A LINING MOUNT

PRIORITY CLAIM

This patent application is a U.S. National Phase of International Patent Application No. PCT/EP2010/000173, filed 14 Jan. 2010, which claims priority to German Patent Application No. 10 2009 006 290.4, filed Jan. 27, 2009, the disclosures of which are incorporated herein by reference in their entirety.

FIELD OF THE INVENTION

The invention relates to a connection of a brake lining and a lining mount, which may be used for a disk brake of a rail vehicle.

BACKGROUND

As an integral part of a disk brake of a rail vehicle, brake linings are held on the lining mount by a guide bar provided on the back of the brake lining and corresponding to a guide track introduced into the lining mount. Here the guide track is formed with a dovetailed cross-section, whilst the matching guide bar is enclosed therein. This affords ease of handling, particularly when changing a brake lining, the brake lining in the working position being locked to the lining mount so that the brake lining is captively secured.

Due, among other things, to the tolerances, the brake lining is enclosed with some play both in the longitudinal direction of the guide track and also transversely thereto. Vibrations occurring in operational service lead to rattling when the brake lining is in the unbraked position and under corresponding loads ultimately to a wearing of the brake lining, the lining mount and in particular the locking mechanism. This is not conducive to an optimization of the service life, with a resulting impact on operating costs.

Although design measures intended to prevent the rattling are known, for example by clamping the brake lining in its longitudinal direction, there is the risk here of the brake linings not bearing flatly against the lining mount. Rather the brake lining may lift off from the lining mount.

In addition a clamping of the brake lining is known, in which a clamping spring is provided, which is tensioned by insertion of the brake lining and which therefore may have only a relatively low spring force, this clamping spring acting transversely to the direction of insertion of the brake lining. This makes removal of the brake lining more difficult in that the clamping action of the clamping spring cannot be specifically cancelled.

A brake lining usually comprises two half-linings, which within admissible tolerances may be of different widths, so that a clamping of both half-linings cannot be ensured using just one clamping spring.

In addition the temperature differences between the brake lining and the lining mount, which occur during braking and which result from differing thermal loads, lead to increased stresses and deformations, which can likewise be an obstacle to a long-lasting working reliability of the components involved.

SUMMARY

The object of the disclosed embodiments is to further develop a connection of the generic type, so as to improve the functional performance of the brake lining/lining mount unit, to increase the service life and to reduce the operating costs.

BRIEF DESCRIPTION OF THE FIGURES

Exemplary embodiments will be described below with reference to the drawings attached, of which.

DETAILED DESCRIPTION

In accordance with at least one disclosed embodiment, the brake lining may be fixed to the lining mount so as to afford a flat bearing contact in the direction of brake application, and a fixing of the brake lining in the lining mount or in the guide track that may be free of play.

The clamping element serving to press the guide bar against the guide track, behind which it simultaneously grips, may be spring-loaded, so that the fixing free of play may be to a certain extent damped. The rattling due to vibrations occurring in operational service and hitherto perceived as very disturbing may be thereby effectively prevented.

In addition, production tolerances are compensated for. Nevertheless, in the event of a temperature-induced differential expansion of the brake lining and the lining mount an unrestricted dimensional compensation occurs.

According to an advantageous development of the disclosed embodiments the brake lining may be secured by a locking device in the circumferential direction of a rail wheel, to which the disk brake corresponds, this safeguard being releasable, in order to change the brake lining, for example.

In order to allow the unrestricted differential thermal expansion in the direction of the longitudinal axis of the brake lining, which substantially corresponds to the direction of rotation of the associated rail wheel, the clamping element may not be operative in this direction but only transversely thereto and in the direction of brake application, that is to say in the X direction and in the Y direction.

For spring-loading of the clamping element, which may be embodied as a clamping lever or a clamping slide, a compression spring may be provided, for example in the form of a coil spring, which may be braced against the clamping element on one side and against the lining mount on the other, the clamping being released by compressing the compression spring, which may be done by an actuating member.

The actuating member in the form of a rotatable camshaft or axially displaceable push rod may be supported on the lining mount, the push rod in the bearing contact area with the clamping element comprising a wedge segment, which serves for actuating the clamping element on displacement of the push rod.

As mentioned, the brake lining comprises two half-linings, each of which comprises a guide bar, which extends in the direction of the longitudinal axis and which corresponds to the guide track of the lining mount.

Although a clamping device may be provided for each brake lining part, these are actuated by a common actuating member, as may be the locking device, and preferably simultaneously.

Figure 1:
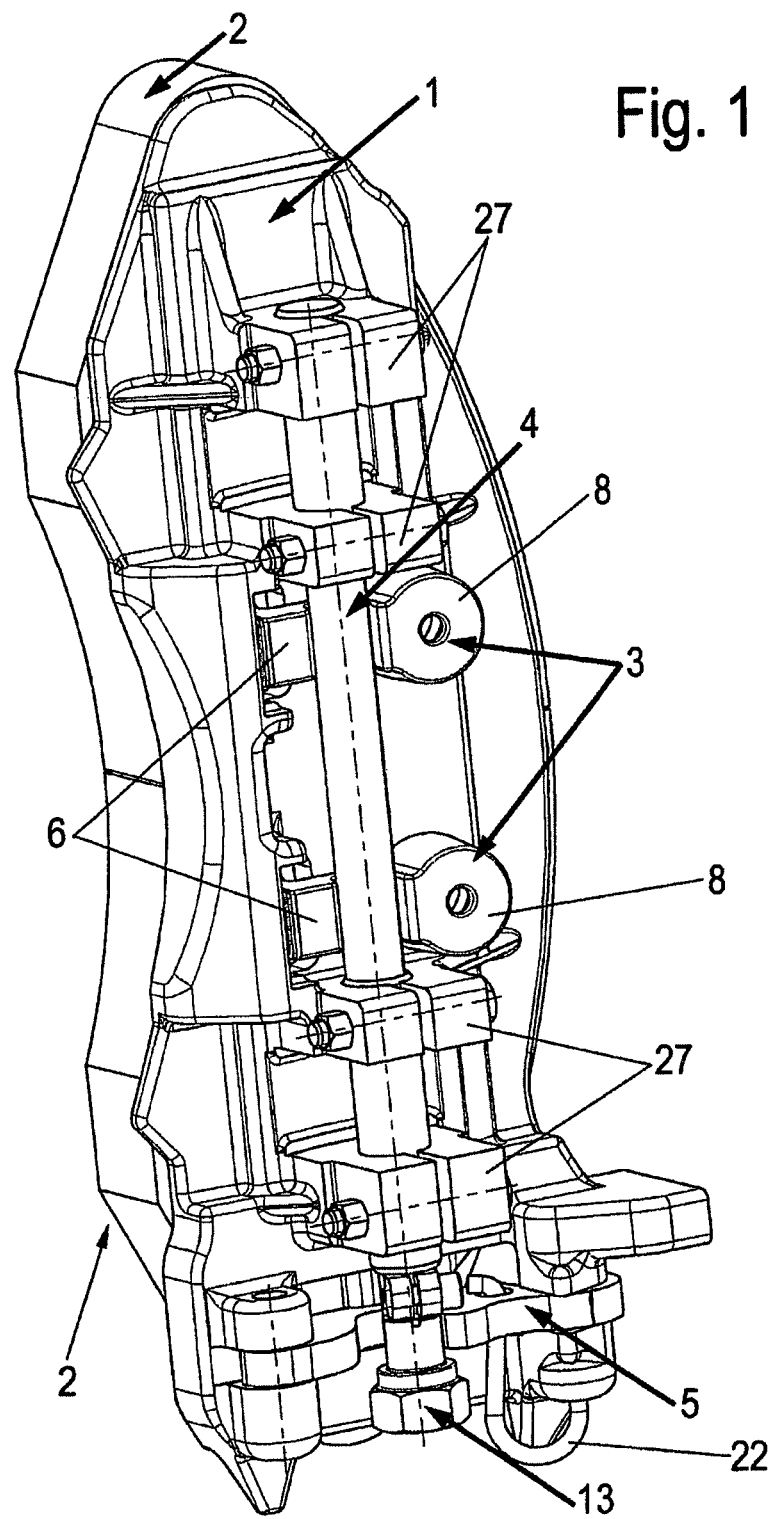
FIG. 1 shows a perspective view of a connection according to the invention.
Figure 2:
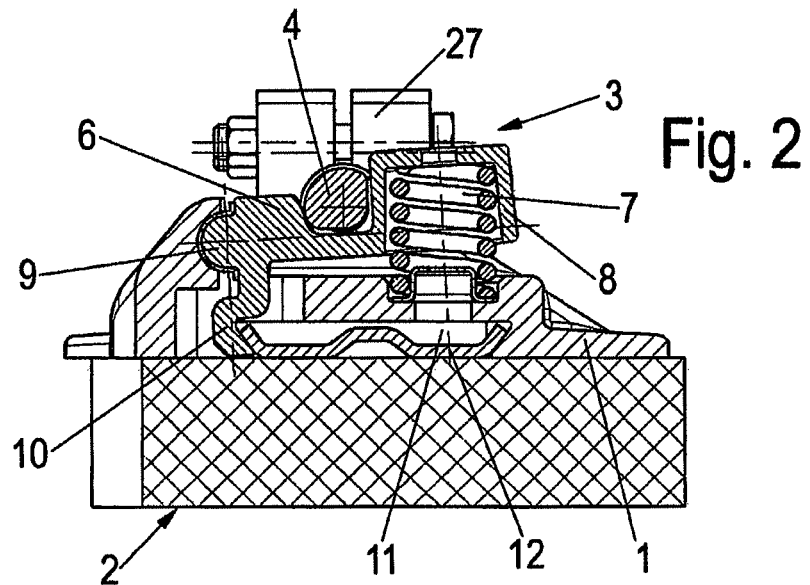
FIGS. 2 and 3 show a section through the connection according to FIG. 1 in different working positions.
Figure 5:
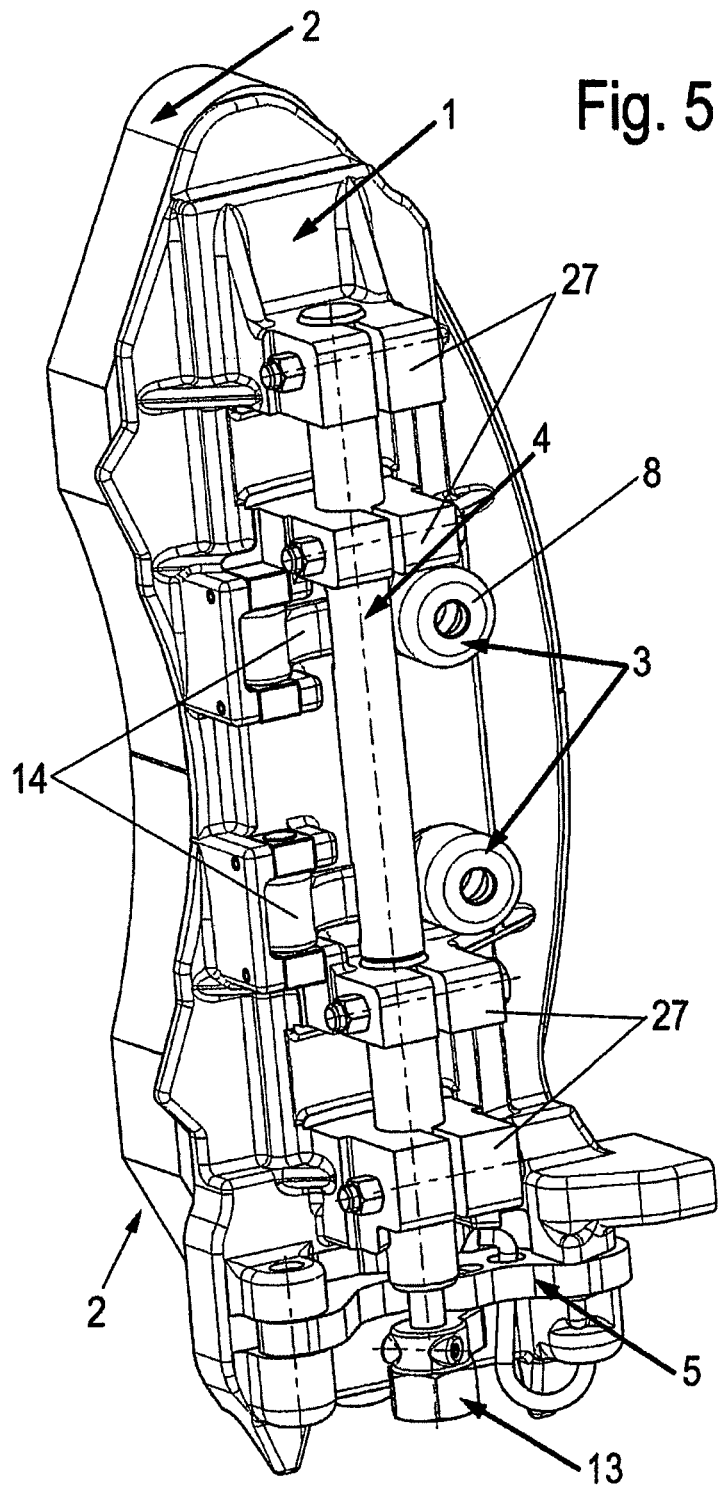
FIG. 5 shows a further exemplary embodiment of the invention, likewise in a perspective view.
Figure 6:
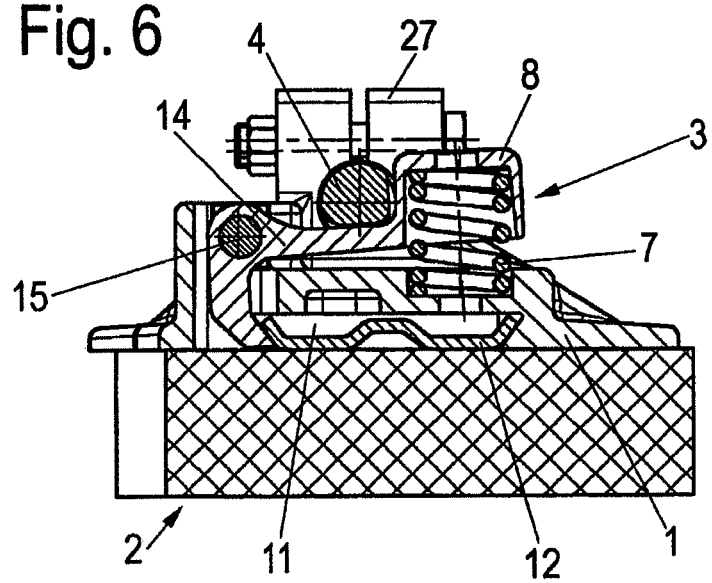
FIGS. 6 and 7 each show a cross section through the connection according to FIG. 5 in different working positions.
Figure 7:
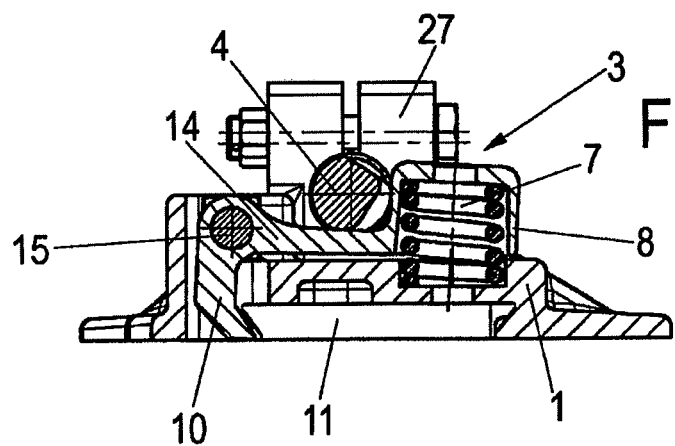
Figure 9:
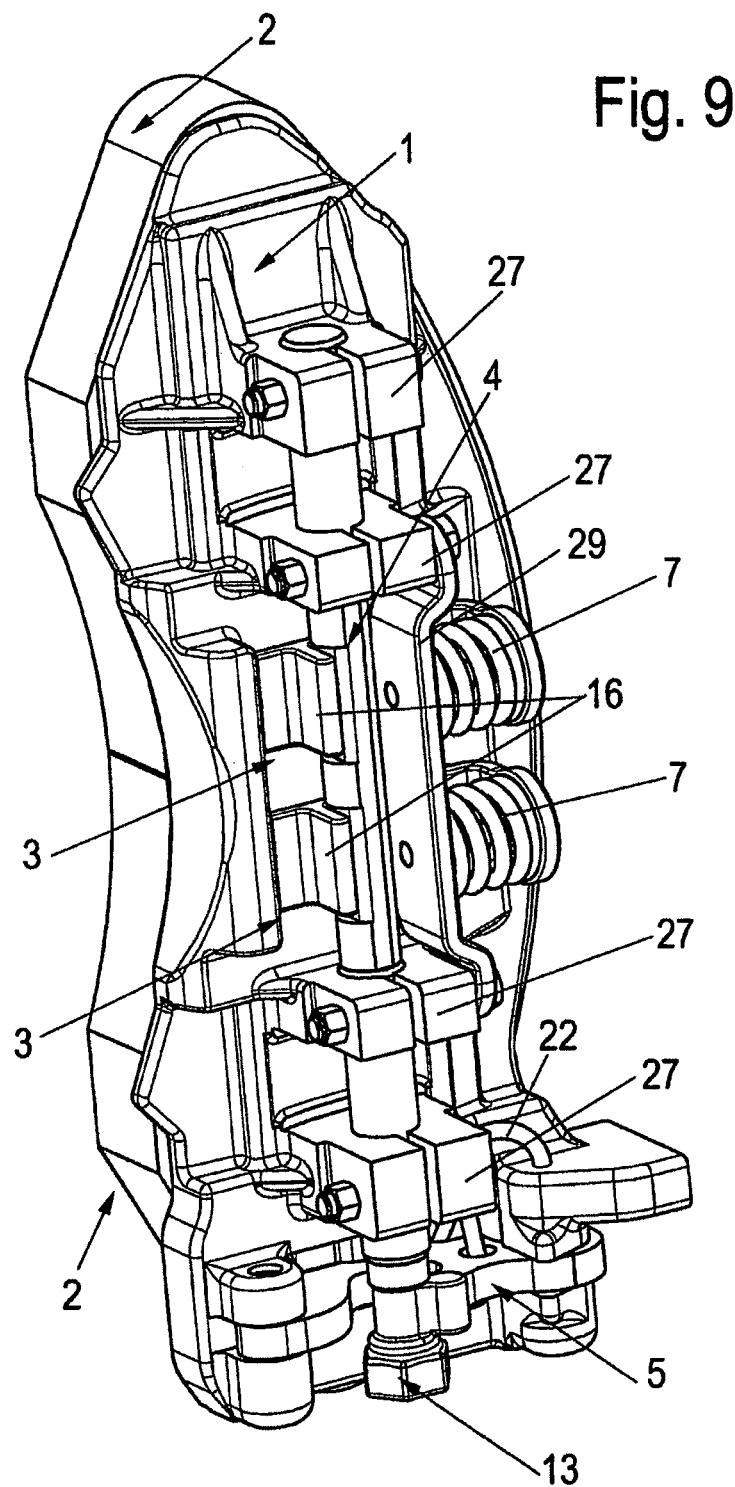
FIG. 9 shows a further exemplary embodiment of the invention in a perspective view.

Each of the FIGS. 1, 5 and 9 represents a connection of a brake lining 2 of a disk brake of a rail vehicle and a lining mount 1, the brake lining 2 being formed in two parts.

Each of the brake lining parts 2 may be fixed by a clamping device 3 held against the lining mount 1, the respective brake lining 2 comprising a guide bar 12 on the back, which may be inserted into a dovetailed guide track 11 of the lining mount 1. The clamping devices 3 represented in the figures can be actuated by way of an actuating member in the form of a camshaft 4, which may be supported in bearing blocks 27 of the lining mount 1. Here the camshaft 4 may be designed for actuating both clamping devices 3, and using a suitable tool can be rotated by a tool-receiving socket 13, which may be connected to the end and which in the exemplary embodiments may be of hexagonal shape.

Figure 3:
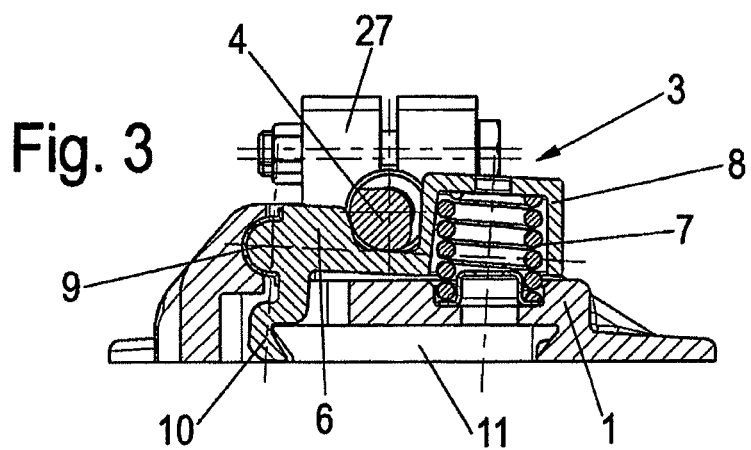
Figure 4:
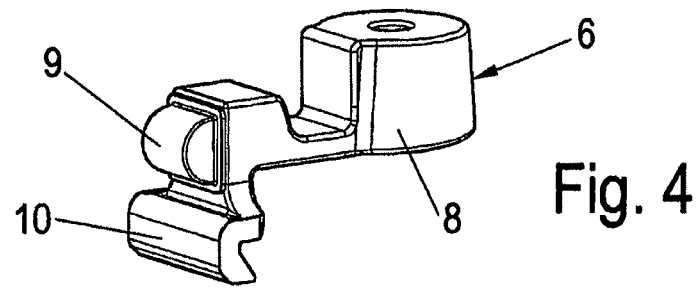
FIG. 4 shows a detail of the connection according to FIGS. 1 to 3.
Figure 8:
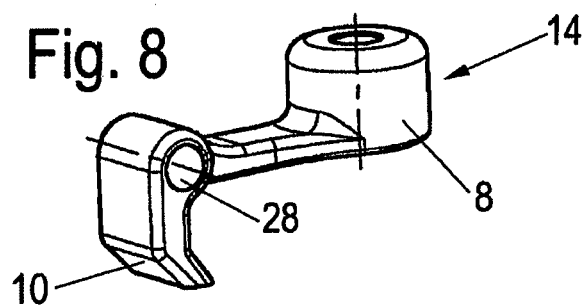
FIG. 8 shows a detail of the connection according to FIGS. 5 to 7.

In the exemplary embodiment shown in FIGS. 1 to 4 and in that in FIGS. 5 to 8, the clamping device 3 comprises a clamping lever 6, 14, which in each of the FIGS. 4 and 8 may be represented as a detail.

This two-armed clamping lever 6, 14, embodied as a bell crank, may be provided with a cap 8, which accommodates a compression spring 7, which on the other side may be braced against the lining mount 1 and against which the camshaft 4 may be rotatable so that the clamping lever 6, 14 disengages.

Opposite the compression spring 7, the clamping lever 6 may be pivotally supported on the lining mount 1, for which purpose, in the exemplary embodiment in FIGS. 1-4, a bearing lug 9, which engages in a matching recess of the lining mount 1, may be formed on the clamping lever 6, a claw 10, which in the working position grips behind the guide bar 12 and presses against the guide track 11, being joined to the bearing lug 9. This can clearly be seen from FIG. 2. Here the camshaft 4 may be rotated so that the force of the compression spring 7 acts as clamping force and presses the claw 10 against the guide bar 12.

To release this clamping connection between the brake lining 2 and the lining mount 1, the camshaft 4 may be rotated correspondingly, so that the formed cam presses the clamping lever 6 in the direction of the lining mount 1 against the force of the compression spring 7, with the result that the claw 10 may be swivelled out of its operative position, as can be seen from FIG. 3. In this position the brake lining 2 can be drawn out of the guide track 11 in the direction of the longitudinal axis.

Instead of a bearing lug 9 the clamping lever 14 in the example shown in FIGS. 5-8 can be pivotally supported on the lining mount 1 by a bearing bolt 15 inserted into a socket 28. Alternatively bearing bolts 15 can be formed laterally on the clamping lever 14. The other working parts correspond to those in the exemplary embodiment according to FIGS. 1-4, so that reference may be made to the description of this.

Instead of a clamping lever, in the design variant shown in FIGS. 9-12 a clamping slide 16 may be provided, which on rotation of the camshaft 4, which bears on the lining mount 1 on the one hand and on an abutting limb 18 of the clamping slide 16 on the other, may be displaced parallel to the base surface of the guide track 11, but may be spring loaded transversely to the longitudinal axis.

For this purpose a compression spring 7 may be likewise provided, which bears on the lining mount 1 on the one hand and on the clamping slide 16 on the other, for which purpose the latter comprises a centering stud 17, on which areas of the compression spring 7 are guided. On the lining mount 1 the compression spring 7 may be braced against a steady 29, which may be bolted to the bearing blocks 27.

Figure 10:
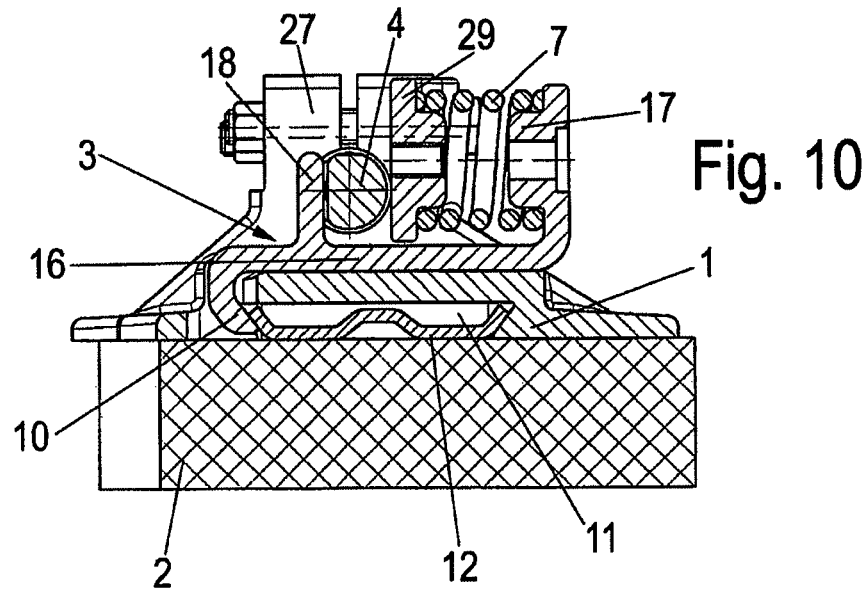
FIGS. 10 and 11 each show a section through the connection according to FIG. 9 in different working positions.
Figure 11:
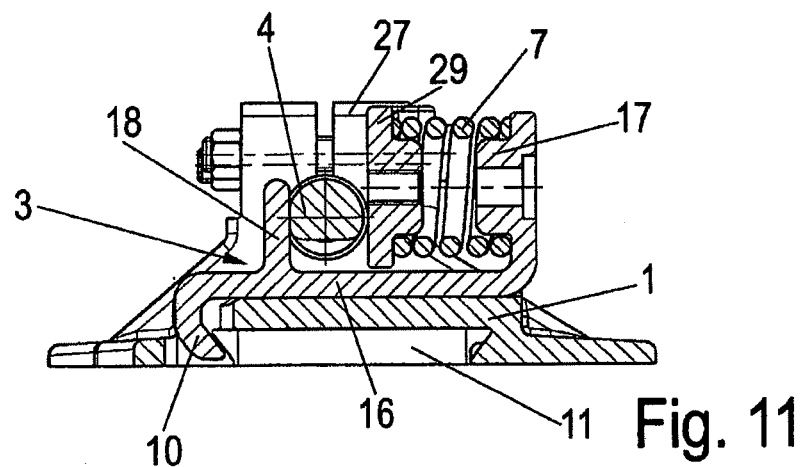
Figure 12:
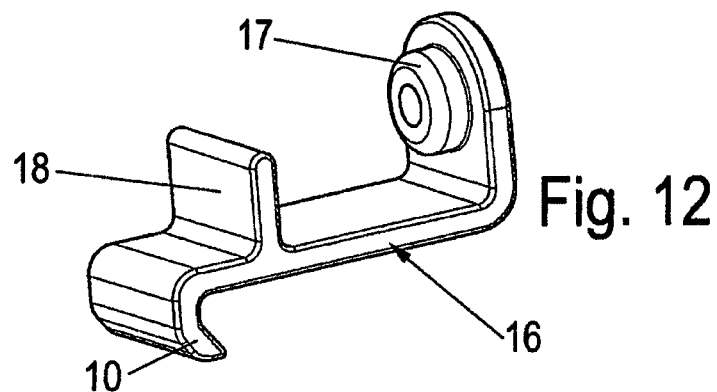
FIG. 12 shows a detail of the invention according to FIGS. 9 to 11.

Whereas FIG. 10 shows the clamping position, in which the brake lining 2 may be firmly clamped to the lining mount 1 by the clamping slide 16, FIG. 11 represents a position in which the brake lining 2 may be withdrawn, that is to say the clamping slide 16 here may be disengaged. The clamping slide 16, which can be seen as a detail in FIG. 12, moreover also comprises a formed-on claw 10, which grips behind the guide bar 12 and presses into the guide track 11.

A locking device 5 may be provided for securing the brake lining 2 against displacement on the lining mount 1 in the area of the insertion aperture for the brake lining 2 on the lining mount 1.

Figure 13:
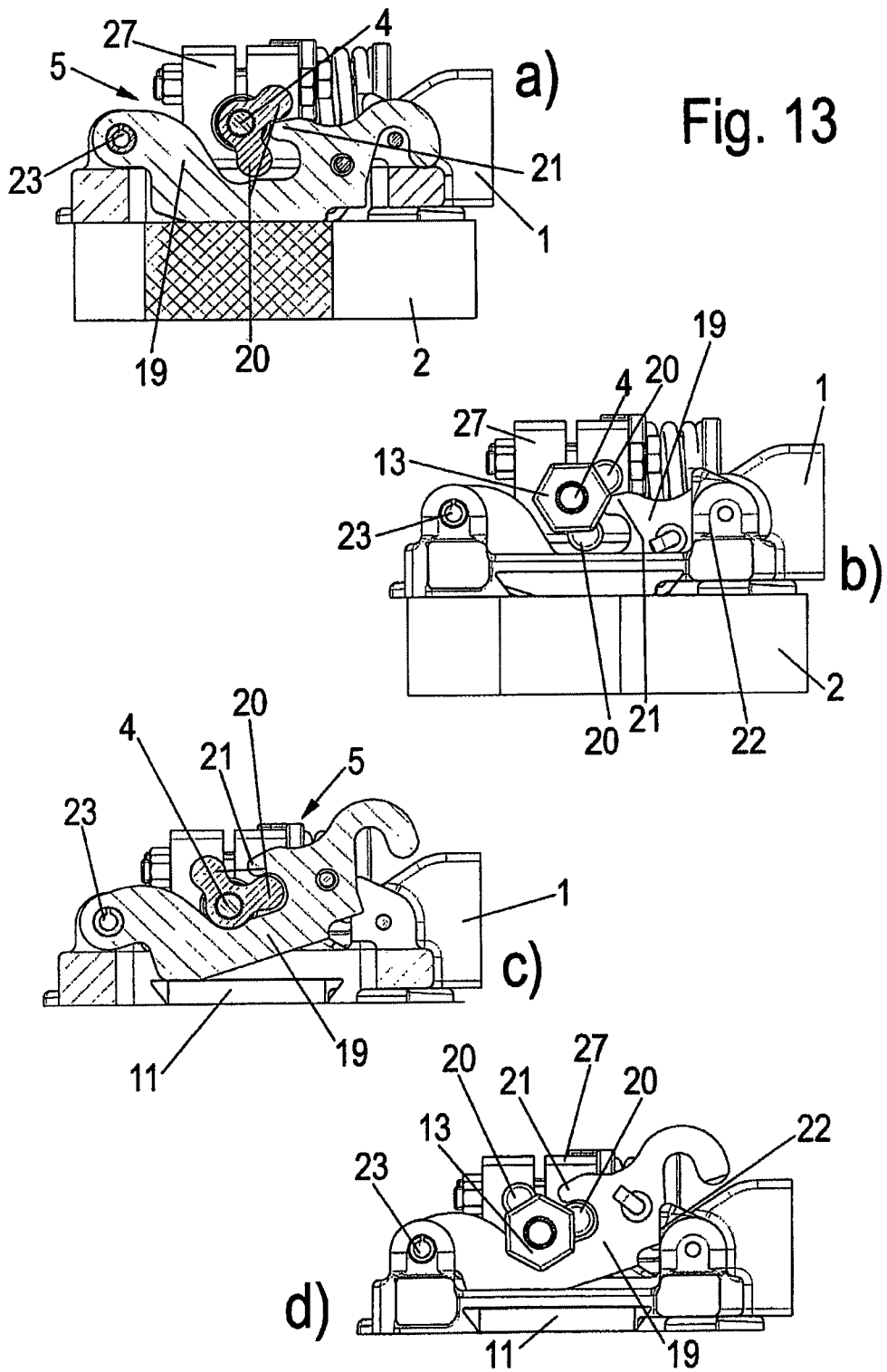
FIG. 13 shows a detail of the connection according to the invention in different working positions.
Figure 14:
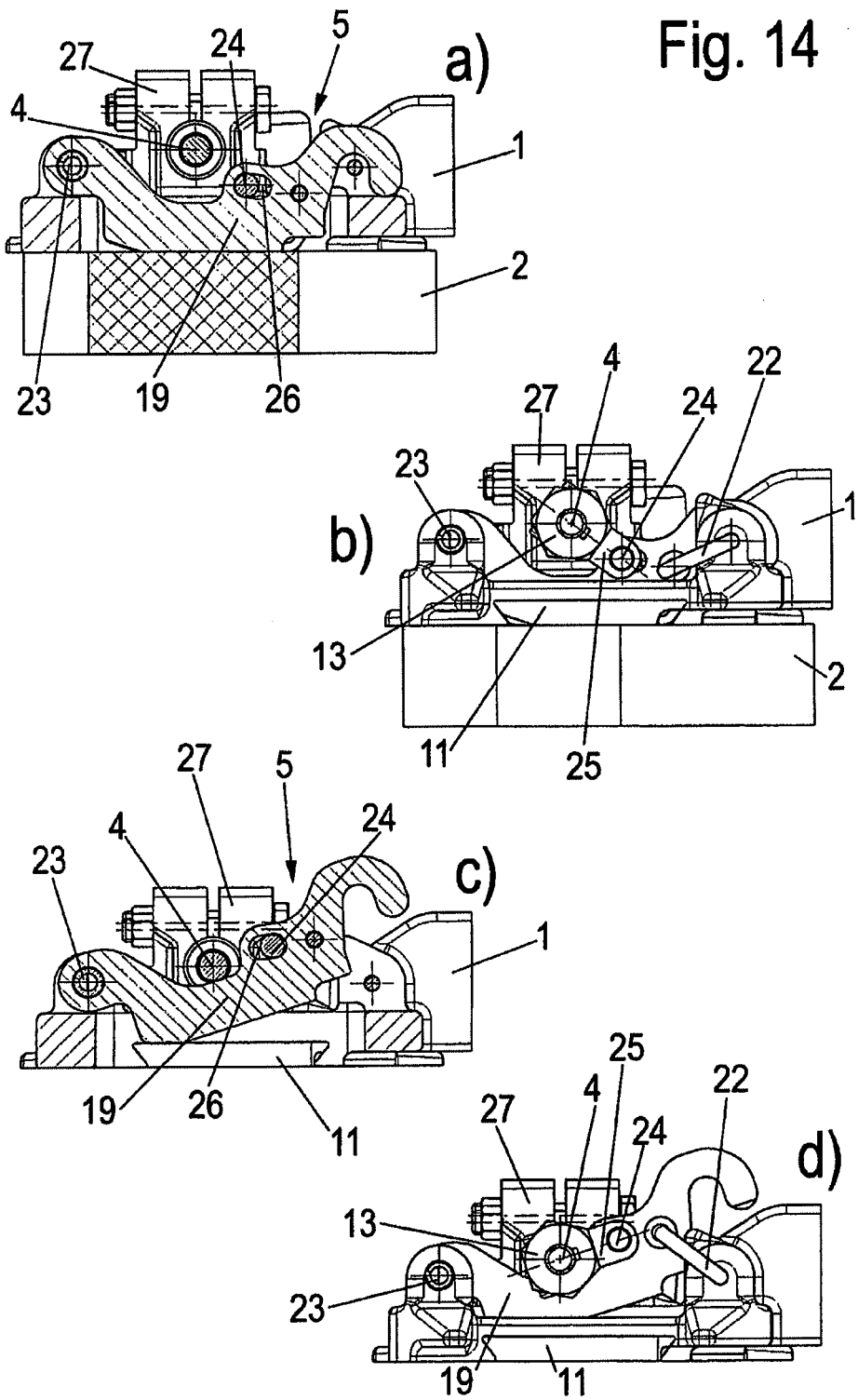
FIG. 14 shows a further design variant of the detail according to FIG. 13, likewise in different positions, each in a side view.

Two design variants of this locking device 5 are represented in FIGS. 13 and 14. Here the respective a) and b) figures show the lining mount 1 with brake lining 2 connected, whilst the respective c) and d) figures represent the lining mount 1 without the brake lining 2 clamped on.

The locking device 5 visible in FIG. 13, which in the a) and c) figures is shown in cross section and in the b) and d) figures is shown as a side view, comprises a swivelling bolt 19, which may be pivotally supported on a pivot bearing 23 of the lining mount 1 and opposite may be held against the lining mount 1 by a shackle 22. This shackle 22 in the form of a U-shaped spring element secures the swivelling bolt in the closed position, on opening of which a dead point of the shackle 22 has to be overcome, which when closing produces a snap effect.

To unlock, the camshaft 4 may be rotated, an eccentric 20 held torsionally secure thereon acting on a formed-on lug 21 of the swivelling bolt 19 and swivelling the latter out of its locking position, as represented in FIG. 13a) and b), into an open position corresponding to FIG. 13c) and d).

In the design variant shown in FIG. 13 two eccentrics 20 are provided, which are arranged at an angle to one another and between which the lug 21 may be positioned. This ensures that the camshaft 4 may be situated in the correct position. It is also easy to recognize in which direction the clamping and locking are released.

In the locking position (FIGS. 13 and 14, a) and b) in each case) the swivelling bolt 19 may be situated in front of the insertion aperture of the guide track 11, so that the enclosed guide bar 12 may be securely enclosed in the displacement direction, that is to say in the direction of the longitudinal axis.

In the example shown in FIG. 14 a torsionally secured side bar 25 may be arranged on the camshaft 4 and carries a drive pin 24, which engages in an elongated hole 26 of the swivelling bolt 19. When the camshaft 4 rotates, the drive pin 24 presses the swivelling bolt 19 out of its locking position, so that the insertion aperture to the guide track 11 may be open, for changing the brake lining 2, for example.

Instead of the arrangement of the shackle 22 shown in FIG. 1, the closed side of which faces outwards, an arrangement shown in FIG. 9 may be chosen, in which the closed side faces inwards, so that an actuation of the swivelling bolt 19 may be possible solely via a rotation of the camshaft 4, whilst the actuation of the swivelling bolt 19 in the example in FIG. 1 is also perfectly possible via a tilting of the shackle 22 through an external action of a tool.

LIST OF REFERENCE NUMERALS 1 lining mount
2 brake lining
3 clamping device
4 camshaft
5 locking device
6 clamping lever
7 compression spring
8 cap
9 bearing lug
10 claw
11 guide track
12 guide bar
13 tool socket
14 clamping lever
15 bearing bolt
16 clamping slide
17 centering stud
18 abutting limb
19 swiveling bolt
20 eccentric
21 lug
22 shackle
23 pivot bearing
24 drive pin
25 side bar
26 elongated hole
27 bearing block
28 socket
29 steady

The invention claimed is:

1. A connection of a two part brake lining of a disk brake of a rail vehicle and a lining mount, the connection comprising:
at least one clamping device for each part of the two part brake lining such that the connection includes at least two clamping devices, wherein each one of the two clamping devices corresponding to a corresponding one of the two part brake lining, each of the clamping devices including a spring-loaded clamping element,
wherein each of the two parts of the brake lining include a guide bar provided on a back of the brake lining, which extends in a direction of the longitudinal axis and which corresponds to a guide track of the lining mount,
wherein the at least one clamping device grips behind each guide bar,
wherein the at least one clamping device is enclosed in the guide track of the lining mount,
wherein each guide bar of each part of the two part brake lining is held against the guide track of the lining mount by the corresponding spring-loaded clamping element and each spring-loaded clamping element is configured to be brought out of engagement by an actuating member rotatably or displaceably attached to and pivotally supported by the lining mount, and
wherein the disengagement draws the two part brake lining out of the guide track in the direction of the longitudinal axis.

2. The connection of claim 1, further comprising at least one compression spring, which is braced against a side of the lining mount and engages with the corresponding spring-loaded clamping element.

3. The connection of claim 1, wherein the actuating member includes a camshaft extending in a direction of the longitudinal axis of the guide track.

4. The connection claim 1, wherein each spring-loaded clamping element includes a two-armed clamping lever.

5. The connection of claim 4, wherein each two-armed clamping lever includes a bell crank.

6. The connection of claim 4, wherein each two-armed clamping lever is pivotally supported on the lining mount.

7. The connection of claim 4, wherein each clamping lever comprises a cap in which a compression spring is held, the compression spring being braced against a side of the lining mount and engaging with the spring-loaded clamping element.

8. The connection of claim 7, wherein, on one side of the cap, each clamping lever is embodied as a claw, which bears on the corresponding guide bar.

9. The connection of claim 4, wherein a portion of each two-armed clamping lever is provided with a bearing lug, which is inserted into a matching recess of the lining mount.

10. The connection of claim 4, wherein a portion of each two-armed clamping lever is supported on the lining mount by bearing bolts.

11. The connection of claim 4, wherein the spring-loaded clamping element includes a clamping slide, which is displaceable parallel to a base surface of the guide track and spring-loaded transversely to the longitudinal extent thereof.

12. The connection of claim 11, wherein the clamping lever comprises a cap in which a compression spring is held, the compression spring being at least partially guided on a centering stud of the clamping slide and on another other side braced against the lining mount.

13. The connection of claim 11, wherein the clamping slide comprises an abutting limb, abutting against a camshaft which also bears against the lining mount.

14. The connection of claim 1, further comprising at least one locking device, which in a locking position closes the guide track in an area of its insertion aperture and which can be actuated via a camshaft.

15. The connection of claim 14, wherein the locking device comprises a swiveling bolt pivotally supported on the lining mount.

16. The connection of claim 14, wherein the camshaft comprises a release element, which corresponds to a swiveling bolt included in the at least one locking device.

17. The connection of claim 16, wherein the release element includes an eccentric, which can be pressed against a formed-on lug of the swiveling bolt for swiveling of the swiveling bolt.

18. The connection of claim 17, wherein a drive pin, which is guided in an elongated hole of the swiveling bolt, is connected to the camshaft.

19. The connection of claim 18, wherein the drive pin is held in a torsionally secured side bar connected to the camshaft.

20. The connection of claim 18, further comprising a shackle, which is held in the lining mount in order to limit swiveling travel and is connected to the swiveling bolt on a side opposite the pivotal connection to the lining mount.

21. The connection of claim 20, wherein the shackle is embodied as a spring element.

* * * * *